United States Patent
Pisanova et al.

(10) Patent No.: US 9,821,353 B2
(45) Date of Patent: Nov. 21, 2017

(54) ORGANIC ACID ACTIVATION OF PERSULFATES

(71) Applicant: PeroxyChem LLC, Philadelphia, PA (US)

(72) Inventors: Elena Pisanova, Amherst, NY (US); Philip Block, Garnet Valley, PA (US)

(73) Assignee: PEROXYCHEM LLC, Philadelphia, PA (US)

(*) Notice: Subject to any disclaimer, the term of this patent is extended or adjusted under 35 U.S.C. 154(b) by 0 days.

(21) Appl. No.: 13/848,092

(22) Filed: Mar. 21, 2013

(65) Prior Publication Data

US 2013/0248458 A1     Sep. 26, 2013

Related U.S. Application Data

(60) Provisional application No. 61/614,242, filed on Mar. 22, 2012.

(51) Int. Cl.
| | | |
|---|---|---|
| *B09C 1/00* | (2006.01) | |
| *B09C 1/08* | (2006.01) | |
| *C02F 1/66* | (2006.01) | |
| *C02F 1/72* | (2006.01) | |
| *C02F 103/06* | (2006.01) | |
| *C02F 101/30* | (2006.01) | |
| *C02F 101/32* | (2006.01) | |
| *C02F 101/36* | (2006.01) | |

(52) U.S. Cl.
CPC ............... *B09C 1/002* (2013.01); *B09C 1/08* (2013.01); *C02F 1/72* (2013.01); *C02F 1/722* (2013.01); *C02F 1/66* (2013.01); *C02F 2101/30* (2013.01); *C02F 2101/322* (2013.01); *C02F 2101/36* (2013.01); *C02F 2103/06* (2013.01); *C02F 2305/02* (2013.01)

(58) Field of Classification Search
CPC .... C02F 1/008; C02F 1/66; C02F 1/72; C02F 1/722; C02F 2101/30; C02F 2101/36; C02F 2101/322; C02F 2305/02; C02F 2305/023; C02F 2103/06; B09C 1/002; B09C 1/08
See application file for complete search history.

(56) References Cited

U.S. PATENT DOCUMENTS

| | | | |
|---|---|---|---|
| 5,830,382 | A | 11/1998 | Tieckelmann et al. |
| 6,808,650 | B1 | 10/2004 | Ager-Wick et al. |
| 7,416,739 | B2 | 8/2008 | Baxter et al. |
| 7,473,372 | B2 | 1/2009 | Block et al. |
| 7,524,141 | B2 | 4/2009 | Sethi et al. |
| 7,576,254 | B2 | 8/2009 | Block et al. |
| 7,662,294 | B1 | 2/2010 | Cox, Jr. |
| 7,745,680 | B1 | 6/2010 | Cox, Jr. |
| 7,928,277 | B1 | 4/2011 | Cox, Jr. |
| 7,968,761 | B1 | 6/2011 | Cox, Jr. |
| 2002/0167120 | A1 | 11/2002 | Fujiwara et al. |
| 2006/0042665 | A1 | 3/2006 | Fernholz et al. |
| 2008/0207981 | A1* | 8/2008 | Hoag et al. .................. 588/320 |
| 2014/0116960 | A1* | 5/2014 | Watts ........................ B09C 1/08 210/747.8 |

FOREIGN PATENT DOCUMENTS

| | | |
|---|---|---|
| CN | 87102687 | 10/1988 |
| CN | 101283082 | 10/2008 |
| CN | 102180540 | 9/2011 |
| JP | 2002294353 | 10/2002 |
| JP | 2003514665 | 4/2003 |
| JP | 2007521940 | 8/2007 |
| JP | 2011173089 | 9/2011 |
| WO | WO 02/04359 A1 | 1/2002 |
| WO | WO 2006/128797 A1 | 12/2006 |
| WO | 2011067721 | 6/2011 |
| WO | WO 2012177526 A2 * | 12/2012 .............. B09C 1/08 |

OTHER PUBLICATIONS

Ocampo, Ana Maria, Disertation titled "Persulfate activation by organic compounds," (2009), Washington State University, Department of Civil and Environmental Engineering, all pages.*
Dictionary defintion of "apply" from dictionary.com (obtained Jun. 2016).*
U.S. Appl. No. 61/501,059, to Watts et al., filed Jun. 24, 2011.*
MSDS of Sodium Persulfate, Acros Organics, 2007.*
MSDS of Sodium Persulfate, FMC, 2006.*
Nagaraja, G.K.—"Polymerization Kinetics of Acrylonitrile by Oxidation: Reduction System Using Potassium Persulfate/Ascorbic Acid in an Aqueous Medium"; Journal of Applied Polymer Science, vol. 121, 1299-1303 (2011).
Curtin, Maria A.—"Ascorbate-induced oxidation of formate by peroxodisulfate: product yields, kinetics and mechanism"; Res. Chem. Intermed., vol. 30, No. 6, pp. 647-661 (2004).
Crimi, Michelle L.—"Experimental Evaluation of Catalyzed Hydrogen Peroxide and Sodium Persulfate for Destruction of BTEX Contaminants"; Soil & Sediment Contamination, 16:29-45, 2007.
Liang, Chenju—"Persulfate oxidation for in situ remediation of TCE. II. Activated by chelated ferrous ion"; Elsevier—Chemosphere 55 (2004) 1225-1233.
Huling, Scott G.—"Groundwater Sampling at ISCO Sites: Binary Mixtures of Volatile Organic Compounds and Persulfate"; Ground Water Monitoring & Remediation 31, No. 2/Spring 2011/pp. 72-79.
First Office Action issued on Aug. 19, 2015 for corresponding CN Application No. 201380023126.4.
Furman, Olha S. et al., "Effect of Basicity on Persulfate Reactivity," Journal of Environmental Engineering, (Apr. 2011), pp. 241-247.
Extended European Search Report issued for corresponding EP Application No. 13764134.6.
Decision on Rejection dated Apr. 1, 2017 for corresponding Chinese Patent Application No. 201380023126.4.

* cited by examiner

*Primary Examiner* — Lucas Stelling
(74) *Attorney, Agent, or Firm* — Duane Morris LLP

(57) ABSTRACT

The present invention is directed to a method of oxidizing an organic compound present in soil, groundwater, process water or wastewater comprising contacting such organic compound with a persulfate and an organic acid selected from the group consisting of ascorbic acid, formic acid, oxalic acid, lactic acid and citric acid, wherein the molar ratio of such organic acid to persulfate is between 1:100 and 3:1.

10 Claims, No Drawings

ORGANIC ACID ACTIVATION OF PERSULFATES

FIELD OF THE INVENTION

The present invention is directed to a method of oxidizing an organic compound present in soil, groundwater, process water or wastewater comprising contacting such organic compound with a persulfate and an organic acid selected from the group consisting of ascorbic acid, formic acid, oxalic acid, lactic acid and citric acid, wherein the molar ratio of such organic acid to persulfate is between 1:100 and 3:1.

BACKGROUND OF THE INVENTION

The presence of volatile organic compounds ("VOCs"), semi volatile organic compounds ("SVOCs") or pesticides in subsurface soils and groundwater is a well-documented and extensive problem in industrialized and industrializing countries. Many VOC's and SVOC's are compounds which are toxic or carcinogenic, are often capable of moving through the soil under the influence of gravity and serve as a source of water contamination by dissolution into water passing through the contaminated soil. Illustrative of such organic contaminants are compounds such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

In many cases discharge of these compounds into the soil leads to contamination of aquifers resulting in potential public health impacts and degradation of groundwater resources for future use. Treatment and remediation of soils contaminated with VOC or SVOC compounds may be expensive, require considerable time, and in many cases be incomplete or unsuccessful. Treatment and remediation of volatile organic compounds that are either partially or completely immiscible with water (i.e., Non Aqueous Phase Liquids or NAPLs) have been particularly difficult. Also treatment of highly soluble but biologically stable organic contaminants such as MTBE and 1,4-dioxane are also quite difficult with many conventional remediation technologies. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes through volatilization from groundwater.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 .mu.g/L, while the maximum concentration limits for chlorobenzenes, polychlorinated biphenyls (PCBs), and ethylene dibromide have been established by the USEPA at 100 .mu.g/L, 0.5 .mu./L, and 0.05 .mu.g/L, respectively. Accordingly, there is a need for improved methods of achieving environmental remediation.

Curtin et al, *Ascorbate-induced oxidation of formate by peroxodisulfate: product yields, kinetics and mechanism*, Res. Chem. Intermed., Vol. 30, No. 6, pp. 647-661 (2004) discloses that the rate constant ($k_1$.) of the reaction of persulfate with ascorbic acid to produce an active $SO_4^-$ radical is 0.02, thereby indicating that ascorbic acid is ineffective to activate persulfate.

Huling et al, *Groundwater Sampling at ISCO Sites: Binary Mixtures of Volatile Organic Compound and Persulfate*, Ground Water Monitoring & Remediation 31, no. 2/Spring 2011/pages 72-79 disclose the use of high levels of ascorbic acid (of molar ratios of 4:1 or greater of ascorbic acid:persulfate) to preserve samples of sodium persulfate and VOCs for analytical purposes. The addition of such high proportions of ascorbic acid deactivates the persulfate without significantly reducing the amounts of VOCs (benzene, toluene, m-xylene, perchloroethylene and trichloroethylene) present in such samples, further suggesting that ascorbic acid is ineffective to activate persulfate in remedial situations.

Accordingly, it is completely unexpected that the addition of lesser proportions of ascorbic acid and/or other organic acids selected from the group consisting of formic acid, oxalic acid, lactic acid and citric acid will effectively activate persulfate such that organic contaminants contacted with such mixture will be effectively oxidized.

SUMMARY OF THE INVENTION

The present invention is directed to a method of oxidizing an organic compound present in soil, groundwater, process water or wastewater comprising contacting such organic compound with a persulfate and an organic acid selected from the group consisting of ascorbic acid, formic acid, oxalic acid, lactic acid and citric acid, wherein the molar ratio of such organic acid to persulfate is between 1:100 and 3:1.

DESCRIPTION OF THE PREFERRED EMBODIMENTS

The present invention is directed to a method of oxidizing an organic compound present in soil, groundwater, process water or wastewater comprising contacting such organic compound with a persulfate and an organic acid selected from the group consisting of ascorbic acid, formic acid, oxalic acid, lactic acid and citric acid, wherein the molar ratio of such organic acid to persulfate is between 1:100 and 3:1.

The present invention is a method for remediation of soil, sediment, clay, rock, and the like (hereinafter collectively referred to as "soil"); groundwater (i.e., water found underground in cracks and spaces in soil, sand and rocks); process water (i.e., water resulting from various industrial processes) or wastewater (i.e., water containing domestic or industrial waste) contaminated with volatile organic compounds, semi-volatile organic compounds, pesticides or herbicides. In addition, it may be used to treat sludges, sands or tars.

Illustrative of the organic contaminants which may oxidized by the process of this invention are trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

The persulfates which may be employed include mono- and dipersulfates, as well as mixtures thereof. Preferably, dipersulfates such as sodium persulfate, potassium persulfate, and/or ammonium persulfate are employed, with sodium dipersulfate being particularly preferred.

The organic acid which may be employed in the practice of this invention is selected from the group consisting of ascorbic acid, formic acid, oxalic acid, lactic acid and citric acid. Preferably such organic acid is ascorbic acid. As is employed herein, the term "organic acid" is intended to include compounds, such as salts, which will form such acid in use upon contact with water, provided that such acid-forming compound does not comprise another component (such as a diavlent or trivalent metal ion) which is known to activate persulfate.

The molar ratio of organic acid to persulfate is typically between 1:100 and 3:1. Preferably, such molar ratio is between 1:50 and 2.5:1, and is most preferably between 1:10 and 2:1.

In the practice of the present invention, the persulfate and organic acid may be combined into an aqueous composition prior to treatment and co-injected into the environmental medium to be treated. Alternatively, such components may be sequentially or simultaneously injected into such environmental medium.

When used in the environmental remediation of soil and/or groundwater, the persulfate should be employed in amounts sufficient to satisfy the soil oxidant demand, compensate for any decomposition and oxidize and destroy the majority if not all of the organic compounds. Soil oxidant demand, (SOD), is the loss of persulfate due to reaction with soil matrix components as well as through auto-decomposition of the persulfate, as well as the chemical oxidant demand, and to compensate for any decomposition of the peroxygen compound.

One method for calculating the preferred amount of persulfate to be used per unit soil mass (for an identified volume of soil at the site) is to first determine the minimum amount of persulfate needed to fully satisfy soil oxidant demand per unit mass of uncontaminated soil. A contaminated soil sample from the identified volume of soil is then treated with that predetermined (per unit mass) amount of persulfate; and the minimum amount of persulfate required to eliminate the organic compounds in that treated sample is then determined Chemical reaction stoichiometry governs the mass/mass ratios and thus the total amount required to achieve the desired result. In actuality the amount of persulfate injected into various locations at a single contaminated site will vary depending upon what is learned from the core samples and other techniques for mapping the subsurface conditions.

SOD also may be calculated according to the formula (I):

$$SOD = V^*(C_0 - C_f)/M_s \quad (I)$$

Where V=volume of the groundwater used in the sample
$C_0$=initial concentration of persulfate at time 0
$C_f$=concentration of persulfate after 48 hours
$M_s$=mass of soil used in the sample Depending upon the type of soil, target compounds, and other oxidant demand at the site, the concentrations of persulfate in the solution used in the present invention may vary from about 0.5 mg/L to greater than about 450,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand, chemical (e.g. VOC) oxidant demand and the oxidant stability existing in the subsurface. The precise chemical compounds in the soil and their concentration can be determined. Contaminated groundwater can be collected. Oxidants can be added to the collected groundwater during laboratory treatability experiments to determine which compounds are destroyed, in what order and to what degree, in the groundwater. It can then be determined whether the same oxidants are able to destroy those chemicals in the soil environment.

The goal is for the concentration of persulfate in the injected solution to be just enough to result in the persulfate reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated soil zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected persulfate solution. Certain soils to be treated may be in unsaturated zones and the method of persulfate injection may be based on infiltration or trickling of the persulfate solution into the subsurface to provide sufficient contact of the soils with the injected chemicals.

In addition, the persulfate and activator may be applied and distributed through the soils, in either saturated or unsaturated conditions through the use of a soil blending process. Such a process makes use of in situ soil blenders, such as rotating drum heads, auguring devices or excavator/backhoe mixing, to blend the oxidant and activator into the soil and provide a more homogenous mixture, allowing for improved contact between the contaminant and the oxidant.

The process of the present invention may be employed in situ or ex situ. For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

The following Examples are provided to further illustrate the invention, but are not intended to limit the scope of the invention in any manner.

EXAMPLES

Example 1

Benzene and trichloroethylene were added to tap water to produce a test solution comprising 6.3 mg/L of benzene and 1.5 ppm of TCE. This test solution was poured into 40 mL vials and sodium dipersulfate (PS) added to a final concentration of 5.0 g/L. Ascorbic acid (AA) was added in solid form in those AA/PS ratios listed in Table 1 below. Control samples containing only the test solution; and containing only 5.0 g/L PS were also prepared. The samples were sealed without leaving any headspace. The samples were stored at 25° C. for one day.

After such storage, the benzene and TCE concentrations present in each sample vial were determined using GC-MS (Shimadzu GCMS-QP2010) and a Purge & Trap sample concentrator (O.I. Analytical 4560), according to EPA methods 5030 and 8260. The results of such testing are summarized in Table 1.

TABLE 1

Testing at 25° C.

| Sample | AA:PS Molar Ratio | Benzene (ppm) | TCE (ppm) |
|---|---|---|---|
| 1-A | No PS or AA | 6.26 | 1.45 |
| 1-B | PS only | 1.33 | 0.55 |
| 1-1 | 1:10 | 0 | 0 |
| 1-2 | 1:4 | 0 | 0 |
| 1-3 | 1:2 | 0 | 0 |
| 1-4 | 1:1 | 0 | 0 |

Example 2

The procedure of Example 1 was repeated, except that the samples were stored at 2° C. The results of such testing are summarized in Table 2.

TABLE 2

Testing at 2° C.

| Sample | AA:PS Molar Ratio | Benzene (ppm) | TCE (ppm) |
|---|---|---|---|
| 2-A | No PS or AA | 6.33 | 1.48 |
| 2-B | PS only | 6.26 | 1.43 |
| 2-1 | 1:10 | 0.22 | 021 |
| 2-2 | 1:4 | 0.14 | 0.15 |
| 2-3 | 1:2 | 0 | 0 |
| 2-4 | 1:1 | 0 | 0 |

A comparison of Table 1 and Table 2 shows that the process of this invention is effective at lower temperatures of less than 20° C., and more typically of less than 10° C. at which most in situ environmental remediation must take place.

Example 3

Benzene and trichloroethylene were added to tap water to produce a test solution comprising 32.7 mg/L of benzene and 18.3 ppm of TCE. The test solution was then divided into two parts, and sodium dipersulfate (PS) was added to one part to a final concentration of 5.0 g/L, and to the second part—to a final concentration of 1.0 g/L. These test solutions were poured into 40 mL vials, to which ascorbic acid (AA) was added in solid form in those AA/PS ratios listed in Table 3 below. Control samples containing only the test solution; and containing only 5.0 g/L PS and 1.0 g/L PS were also prepared. The samples were sealed without leaving any headspace. The samples were then divided into two parts. One part was stored at 25° C. for two days, and the second at 2° C. for two days.

After such storage, the benzene and TCE concentrations present in each sample vial were determined using GC-MS (Shimadzu GCMS-QP2010) and a Purge & Trap sample concentrator (O.I. Analytical 4560), according to EPA methods 5030 and 8260. The results of such testing are summarized in Tables 3-6.

TABLE 3

Testing at 25° C.; 5.0 g/L PS

| Sample | AA:PS Molar Ratio | Benzene (ppm) | TCE (ppm) |
|---|---|---|---|
| 3-A | No PS or AA | 32.5 | 18.1 |
| 3-B | PS only | 20.6 | 12.1 |
| 3-1 | 1:10 | 4.11 | 2.01 |
| 3-2 | 1:4 | 2.5 | 1.6 |
| 3-3 | 1:2 | 1.2 | 0.4 |
| 3-4 | 1:1 | 0.9 | 0.1 |
| 3-5 | 2:1 | 2.7 | 1.3 |
| 3-6 | 3:1 | 15.0 | 10.1 |
| 3-7 | 4:1 | 28.7 | 16.6 |
| 3-8 | 6:1 | 30.3 | 16.7 |
| 3-9 | 8:1 | 31.8 | 17.2 |

TABLE 4

Testing at 25° C.; 1.0 g/L PS

| Sample | AA:PS Molar Ratio | Benzene (ppm) | TCE (ppm) |
|---|---|---|---|
| 4-A | No PS or AA | 32.6 | 18.2 |
| 4-B | PS only | 24.7 | 13.4 |
| 4-1 | 1:10 | 6.5 | 4.8 |
| 4-2 | 1:4 | 4.0 | 3.1 |
| 4-3 | 1:2 | 2.1 | 1.7 |
| 4-4 | 1:1 | 1.4 | 1.0 |
| 4-5 | 2:1 | 5.3 | 4.6 |
| 4-6 | 3:1 | 15.7 | 11.0 |
| 4-7 | 4:1 | 29.5 | 16.5 |
| 4-8 | 6:1 | 30.5 | 17.2 |
| 4-9 | 8:1 | 32.4 | 17.8 |

TABLE 5

Testing at 2° C.; 5.0 g/L PS

| Sample | AA:PS Molar Ratio | Benzene (ppm) | TCE (ppm) |
|---|---|---|---|
| 5-A | No PS or AA | 32.6 | 18.3 |
| 5-B | PS only | 29.3 | 17.6 |
| 5-1 | 1:10 | 4.9 | 2.7 |
| 5-2 | 1:4 | 2.6 | 1.3 |
| 5-3 | 1:2 | 1.2 | 0.7 |
| 5-4 | 1:1 | 0.5 | 0.2 |
| 5-5 | 2:1 | 4.4 | 1.9 |
| 5-6 | 3:1 | 13.8 | 10.1 |

TABLE 5-continued

Testing at 2° C.; 5.0 g/L PS

| Sample | AA:PS Molar Ratio | Benzene (ppm) | TCE (ppm) |
|---|---|---|---|
| 5-7 | 4:1 | 30.6 | 16.4 |
| 5-8 | 6:1 | 30.9 | 17.2 |
| 5-9 | 8:1 | 31.6 | 17.0 |

TABLE 6

Testing at 2° C.; 1.0 g/L PS

| Sample | AA:PS Molar Ratio | Benzene (ppm) | TCE (ppm) |
|---|---|---|---|
| 6-A | No PS or AA | 32.7 | 18.3 |
| 6-B | PS only | 30.6 | 18.1 |
| 6-1 | 1:10 | 12.2 | 8.7 |
| 6-2 | 1:4 | 5.3 | 3.6 |
| 6-3 | 1:2 | 4.2 | 2.7 |
| 6-4 | 1:1 | 3.8 | 1.7 |
| 6-5 | 2:1 | 6.5 | 4.2 |
| 6-6 | 3:1 | 18.0 | 11.0 |
| 6-7 | 4:1 | 29.9 | 17.7 |
| 6-8 | 6:1 | 32.3 | 17.7 |
| 6-9 | 8:1 | 32.9 | 18.2 |

The data in Tables 3 through 6 show that the process of this invention is effective at AA:PS molar ratios in the range of about 1:10 to about 3:1. The process is effective at lower temperatures (2° C.) which are frequently encountered in environmental remediation.

Example 4

Benzene was added to tap water to produce a test solution comprising 9.1 mg/L of benzene. This test solution was poured into 40 mL vials and sodium dipersulfate (PS) added to a final concentration of 5.0 g/L. Those organic acids indicated were added in those Acid/PS ratios listed in Table 7 and Table 8 below. Control samples containing only the test solution; and containing only 5.0 g/L PS were also prepared. The samples were sealed without leaving any headspace. One part of the samples was stored at 25° C., and another part at 2° C. for one week. Samples were tested periodically for benzene concentration using GC-MS (Shimadzu GCMS-QP2010) and a Purge & Trap sample concentrator (O.I. Analytical 4560), according to EPA methods 5030 and 8260. The results of such testing are summarized Table 7 and Table 8.

TABLE 7

Testing at 25° C.

| Sample | Acid | Acid:PS Molar Ratio | Benzene (ppm) 1 Day | Benzene (ppm) 4 days |
|---|---|---|---|---|
| 7-A | — | No PS or Acid | 9.11 | 9.08 |
| 7-B | — | PS only | 3.53 | 1.03 |
| 7-1 | Oxalic | 1:10 | 3.04 | 0.87 |
| 7-2 | Oxalic | 1:4 | 2.70 | 0.72 |
| 7-3 | Oxalic | 1:2 | 2.59 | 0.65 |
| 7-4 | Citric | 1:10 | 2.96 | 0.12 |
| 7-5 | Citric | 1:4 | 2.11 | 0.00 |
| 7-6 | Citric | 1:2 | 1.91 | 0.00 |
| 7-7 | Formic | 1:10 | 2.45 | 0.00 |
| 7-8 | Formic | 1:4 | 1.56 | 0.00 |
| 7-9 | Formic | 1:2 | 0.75 | 0.00 |

TABLE 7-continued

Testing at 25° C.

| Sample | Acid | Acid:PS Molar Ratio | Benzene (ppm) 1 Day | Benzene (ppm) 4 days |
|---|---|---|---|---|
| 7-10 | Lactic | 1:10 | 2.86 | 0.45 |
| 7-11 | Lactic | 1:4 | 2.48 | 0.38 |
| 7-12 | Lactic | 1:2 | 2.28 | 0.30 |

TABLE 8

Testing at 2° C.

| Sample | Acid | Acid:PS Molar Ratio | Benzene (ppm) 1 day | Benzene (ppm) 4 days | Benzene (ppm) 8 days |
|---|---|---|---|---|---|
| 8-A | — | No PS or Acid | 9.14 | 9.12 | 9.13 |
| 8-B | — | PS only | 8.58 | 6.60 | 3.71 |
| 8-1 | Oxalic | 1:10 | 7.99 | 6.22 | 3.09 |
| 8-2 | Oxalic | 1:4 | 6.82 | 5.77 | 2.78 |
| 8-3 | Oxalic | 1:2 | 5.99 | 4.68 | 2.15 |
| 8-4 | Citric | 1:10 | 6.11 | 3.94 | 2.01 |
| 8-5 | Citric | 1:4 | 5.49 | 3.53 | 1.44 |
| 8-6 | Citric | 1:2 | 4.82 | 3.10 | 0.87 |
| 8-7 | Formic | 1:10 | 5.95 | 3.89 | 1.93 |
| 8-8 | Formic | 1:4 | 5.19 | 3.13 | 1.26 |
| 8-9 | Formic | 1:2 | 4.52 | 2.84 | 0.72 |
| 8-10 | Lactic | 1:10 | 8.04 | 6.33 | 3.32 |
| 8-11 | Lactic | 1:4 | 7.22 | 5.42 | 2.85 |
| 8-12 | Lactic | 1:2 | 6.55 | 4.81 | 2.43 |

The data in Tables 7 and 8 show that oxalic acid, citric acid, formic acid and lactic acid are all effective activators for PS, at both 2° C. and 25° C.

What is claimed is:

1. A method of oxidizing an organic contaminant present in soil, groundwater, process water or wastewater comprising contacting the organic contaminant present in the soil, groundwater, process water or wastewater with a persulfate solution and an organic acid solution selected from the group consisting of ascorbic acid, formic acid, oxalic acid, lactic acid and citric acid, to form an oxidizing solution at a molar ratio of organic acid to persulfate effective to activate the persulfate and oxidize the organic contaminant, wherein the molar ratio of such organic acid to persulfate is between 1:10 and 2:1, and wherein the pH of the oxidizing solution is acidic.

2. The method of claim 1 wherein the persulfate is a dipersulfate.

3. The method of claim 2 wherein the dipersulfate is sodium persulfate.

4. The method of claim 1 wherein the organic acid is ascorbic acid.

5. The method of claim 1 wherein the organic contaminant is selected from the group consisting of trichloroethylene (TCE), vinyl chloride, tetrachloroethylene (PCE), methylene chloride, 1,2-di chloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

6. The method of claim 1 wherein such method is performed in situ.

7. The method of claim 1 wherein such method is performed ex situ.

8. The method of claim 6 wherein the persulfate and organic acid are added simultaneously.

9. The method of claim 6 wherein the persulfate and organic acid are added sequentially.

10. The method of claim 1, wherein the contacting step comprises injection, blending, or mixing the persulfate and the organic acid with the soil, groundwater, process water or wastewater.

* * * * *